United States Patent [19]

Zey

[11] Patent Number: 5,479,473
[45] Date of Patent: Dec. 26, 1995

[54] METHOD AND APPARATUS FOR TESTING CALL PATHS OVER LONG DISTANCE CARRIER NETWORKS

[75] Inventor: David A. Zey, Herndon, Va.

[73] Assignee: MCI Communications Corporation, Washington, D.C.

[21] Appl. No.: 84,974

[22] Filed: Jun. 25, 1993

[51] Int. Cl.⁶ .............................. H04M 1/24; H04J 1/16; H04J 3/14
[52] U.S. Cl. ................................ 379/10; 379/15; 379/16; 370/14; 370/15
[58] Field of Search .......................... 370/14, 15; 379/1, 379/5, 6, 10, 11, 12, 13, 14, 15, 16, 17, 18, 22, 29, 27

[56] References Cited

U.S. PATENT DOCUMENTS

| | | | |
|---|---|---|---|
| 4,455,644 | 6/1984 | Fox et al. | 379/22 X |
| 4,568,802 | 2/1986 | Bradley et al. | 379/5 |
| 4,582,964 | 4/1986 | Dickens | 379/5 |
| 4,841,560 | 6/1989 | Chan et al. | 379/22 X |
| 4,910,760 | 3/1990 | Reformato | 379/15 X |

OTHER PUBLICATIONS

*Hekimian Highlights*, vol. 5, No. 2, Jul. 1992.
Hekimien Highlights vol. 5, No. 2, Jun. 1992.

*Primary Examiner*—Stephen Chin
*Assistant Examiner*—Paul Loomis
*Attorney, Agent, or Firm*—Pollock, Vande Sande & Priddy

[57] ABSTRACT

A remote test site is connected to a maintenance port of a long distance carrier switch. The remote test site is capable of placing calls through the maintenance port of the long distance carrier switch, testing from the switch forward to the called party for any trouble occurring in the elected call path. A test site terminal connected via an X.25 network, permits remote access to the test site. Segments of a calling path are identified via the test site terminal to the remote test site. Calls are placed through various long distance carrier switches involved in a call path to isolate the trouble occurring in a path reported by a dissatisfied customer. Calls may be placed through selected output ports of each switch identifying to the maintenance port of the switch the output port number and the destination digits for the call.

16 Claims, 6 Drawing Sheets

METHOD AND APPARATUS FOR TESTING CALL PATHS OVER LONG DISTANCE CARRIER NETWORKS

The present invention relates to the testing of telephone and packet-switched services over a long distance carrier network. Specifically, a system for testing and measuring the performance of each segment in a call path reported to be malfunctioning is described.

Long distance telephone carrier networks which carry both voice and digital traffic employ a variety of interconnecting links and trunks to provide a telecommunication path between customers. The originating telephone or data traffic will first pass through a local telephone company network. Telephone traffic may be digitized, and the digitized data is sent via a T1 carrier link to a centrally-located switch. Dialing digits originated by the customer will identify to the connected switch the destination address of the called party. The switch interpolates the dialing digits and makes a connection to an outgoing port which is connected by a dedicated link to yet another switch at a location closer to the called party. By interconnecting various switches, and routing the call based on the destination digits, it is possible to make a connection with a distant local telephone company servicing the called party's telephone or data line. The remotely located local telephone company will connect to the called party the incoming call processing signals and return a ringing signal to the calling party until the called party can respond by going off-hook.

The connection through each of the network switches is under control of the calling and called parties. Once the called party has gone off-hook, and the call processing is completed, the two parties may exchange information, either over voice channels or through a connected data stations.

If a calling party experiences trouble in obtaining a path having inadequate signal-to-noise ratio, or which suffers from other performance-limiting conditions, the calling party may complain to the long distance carrier. The long distance carrier investigates customer complaints about the call path performance. Each segment making up the call path is tested to identify the segment causing the problem.

Complaints from a calling party are generally received in a central location which directs efforts to test the called circuit path. Presently, it is possible for a long distance carrier to initiate a check of the circuit from the first switch to receive the calling party's traffic, backwards to the calling party. This will permit isolation of this segment of the call path to determine whether it may be the source of the reported trouble.

Testing from the first switch connected to the calling party outward, to other switch locations and to the called party's local telephone company presents a more difficult problem. Any attempt to route a call from the first or subsequent switches of the long distance carrier to isolate other call path segments requires tests to be conducted at the actual switch sites. These tests require that appropriate switch ports involved in the call path be identified, and a call be placed from the switch over the identified ports. The procedure must be repeated at each switch encountered in the call path until the segment containing the problem is located. The process involves personnel at each switch location in the call path to initiate a call from each switch to the called party.

The procedure for isolating troubles in the common carrier network is equally applicable to both telephone traffic and data service. In order to effectively compete in an environment where more than one long distance carrier is available to customers of the local telephone networks, performance troubles must be isolated quickly and corrective measures quickly taken.

Isolating particular segments of a long distance call path is tedious because the call path between customers may change each time a call is placed. Therefore, the exact routing of a call which was reported to be of sub-standard performance must be determined, so that the identical path may be tested.

SUMMARY OF THE INVENTION

It is an object of this invention to provide for testing of circuit paths used in a particular call by a long distance carrier.

It is a more specific object of this invention to provide for testing of each segment of a call path which has been reported to contain a trouble from a central location.

These and other objects of the invention are provided by an apparatus and method which will test from a central location each segment of any call path created by a long distance carrier network.

Each of the switches of a long distance carrier network includes at least one input port configured as a maintenance port. The configured maintenance port permits calls to be placed through any specifically selected port of the switch. This call is initiated by identifying the called party's destination, as well as the output port over which the call is to be placed. Thus, it is possible to test through the same switch output port and its connected link which was involved in a call path reported as having a trouble.

The invention advantageously provides for the remote placement of calls from a central location through the maintenance port of each switch. Each of the output switch ports involved in a call path can be individually selected and a call placed to the same party which was the subject of the customer's earlier call which generated the complaint. In this way, it is possible to test each call path segment by segment, from the originating switch through all intermediate switches to the final destination local area telephone company.

In carrying out the invention, a digital remote test unit is located at a central location and includes a T1 carrier interface which connects to each switch with the DS$\phi$S configured as maintenance ports of the long distance carriers switches. More than one remote test unit may be utilized to divide the network switches into a manageable group to be accessed by the individual remote test units.

Whether one or multiple remote test units are employed, they are network connected to a single test site. The single test site comprises a computer terminal which can communicate over the network, receiving as well as transmitting commands to each of the remote test sites employing a remote test unit.

In accordance with the preferred embodiment of the invention, the test site, through conventional means, will determine the network call path which resulted in a trouble report being filed. By making inquiry to each of the switches, it is possible to identify from the log contained in each switch the particular input and output port over which the trouble call was placed. Having this knowledge, it is possible to command a remote test unit to place the call through the maintenance port of each switch involved in the connection. The maintenance port will place the call through the identified output port and link connecting the output port to the next switch in the call path which resulted in the customer's complaint. Alternatively, the maintenance port can place a call through an input port, servicing the trouble call back to the customer.

Each switch is tested so that the output port and link connecting the output port to the next switch involved in the call path is isolated from the previous portion of the connection. As the call is placed over each of the switches through the maintenance port, it becomes possible to identify a segment connecting the switches which is the source of the reported trouble.

The invention also permits the call path from the first switch backward to the calling party to be tested. By accessing a DAX connected to the local telephone company network, it is possible for the remote test unit to place the call in this direction.

The invention permits testing in both voice circuits, as well as data circuits, such as switched 56 services which utilize the common carrier network.

The testing system, in accordance with the present invention, permits various standard tests to be made from the test site. These tests include establishing loop back, or termination conditions between the output port which was seized by the maintenance port on command, and the destination party's equipment or dialing into the local telephone company switch test numbers. Accessing and initiating the loop-backed call, or test number, permits test tone measurements, data pattern responses and noise measurements to be made.

DESCRIPTION OF THE PREFERRED EMBODIMENT

Figure 1:
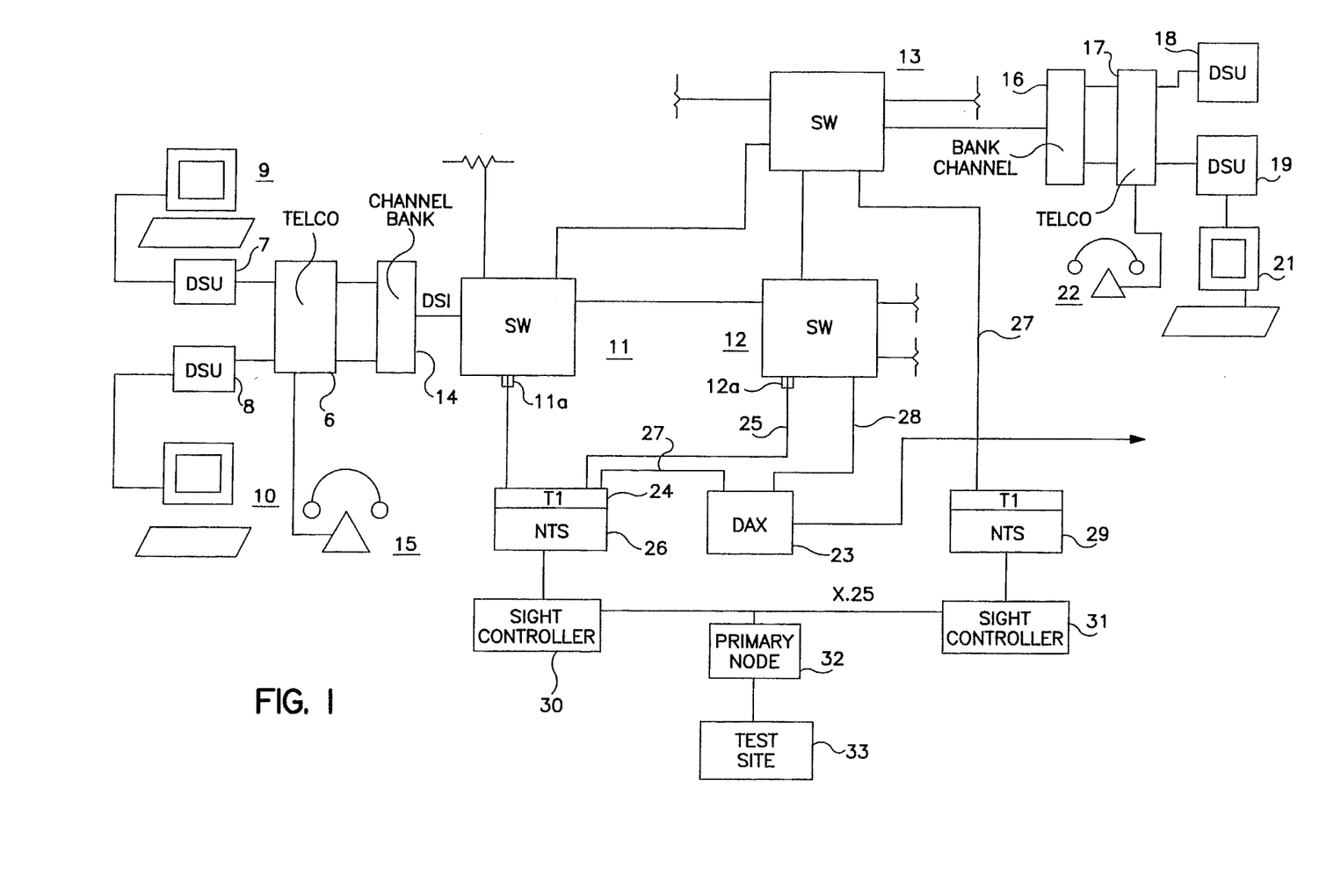
FIG. 1 illustrates a common carrier network employing a testing system in accordance with one embodiment of the present invention.

Referring now to FIG. 1, there is shown a common carrier network which interconnects local telephone company networks 6 and 17. Traffic can originate from either of the local area telephone networks (TELCO) 6 or 17, and be connected to the other TELCO via a plurality of digital switches 11, 12 and 13. The digital switches 11, 12 and 13, as will be apparent from FIG. 2, have a plurality of input and output ports. The input ports connect either to a local telephone network 6 or 17, or in some cases to a leased line, permitting direct customer access to one of the common carrier switches 11, 12 and 13.

The channel banks 14 and 16 provide a plurality of DSϕS which are embedded within the T1 link which directly connect the switches 11, 12 and 13. The input channels represented by DS1 comprise up to 24 T1 DSϕ channels which a corresponding switch 11, 12 or 13 will connect a DSϕ to an output port of the switch. The output ports of the switch are directly linked to a second switch at a different geographical location over a dedicated link which terminates at an input port of a distant switch.

When a call is placed by either the voice station 22, or data station 21, the appropriate channel card for voice or OCU for SW56 (16) provides the call process signalling to the station 19 or 22 which has gone off-hook. The off-hook station transmits the destination digits of the called party to which a communication path is to be established.

The TELCO 17 conveys to the respective connected switch 13 the destination digits for creating a path to the called party which may be telephone station 15 or data station 9 or 10.

The channel bank 16 creates 24 DSϕ channels which are connected to the switch 13 at DS.1 level. The switch 13 will decode the called party's calling number and select an output port based on various routing criteria established in the industry for signalling an adjacent switch, i.e., 12 or 13, to make a call path connection with switch 11.

The switches 11, 12, 13, engage in a protocol of their own to set up the call with the TELCO 6 identified by the calling digits. The TELCO 6 will provide a ringing signal to either the called voice station 15 or called DSU 7 for data station 9, depending on the decoded calling digits it receives.

The foregoing process of establishing a call path is utilized in most modern common carrier networks. Once the call path is established it is possible that one or more of the segments of the call path may introduce noise, attenuation or some other performance limiting anomaly interfering with the quality of the call path. A customer, operating either voice station 22 or data station 21, will initiate a trouble report which is called in to a test site 33. In accordance with the prior art, an operator at the test site 33 has the capability of connecting to a test system 26. The test system 26 and test site 33 are linked over an X.25 data packet network through a site controller 30 and a primary node 32 of the X.25 data network. The test system shown in 26 may be a Hekimian model 6700 remote testing device. The testing device 26 includes a T1 carrier interface, and T1 link 24 connecting the test device 26 to the T1 interface 11a of switch 11. A second T1 carrier 25 connects the test system 26 to the T1 interface 12a of switch 12. The DSϕS within this T1 11a would be configured as maintenance ports within switch 11.

Also shown is a second test site, including a test system 29 connected via a respective site controller 31 in the X.25 data network. Using the of test devices 26, 29, it is possible to initiate test procedures with each of the switches from test site 33.

A DAX 23 is shown, which may also be connected via a T1 carrier link 20 with the test device 26. The DAX 23, as is common in network architecture, connects to a TELCO or customer having a dedicated T1 carrier 27. The DAX 23 is also connected via a T1 carrier link 28 to the switch 12.

T1 carrier link 27 will include 24 DSOs, i.e., channels which are terminated via a T1 interface on switch 12 to 24 ports of the switch. One of the ports and DSOs serving the port can be configured as a maintenance port, permitting the test system 26 access via the DAX 23 to a port configured as a maintenance port on switch 12. In this way, the test system has the capability of accessing a maintenance port on the switch through the DAX or accessing a connected customer or TELCO through the DAX, permitting checking all path segments towards the originating caller as well as away from the originating caller in the direction of the called party.

Through either the DAX 23 or directly to a port configured as a maintenance port, such as 11a of switch 11, the test system 26, via the maintenance port, can access any other port on the switch, both input and output ports in the call path being checked. In the case of an input port, it may be useful to access an input port which was used in a call path being tested by seizing the input port and testing the circuit from the input port back to the originating caller. This scenario may be accomplished through a DAX as well by using one of the channels of the T1 link connecting the DAX 23 to switch 12 to access a port configured as a maintenance port. The maintenance port can thereafter be used to place a call either to a port which serves as an input port to a call which resulted in the trouble report, or through the switch exiting the output port involved in the call.

Before discussing the operation of the test devices 26, 29 in connection with the site 33, the description of the architecture of each of the switches 11 through 13 will be made.

Figure 2:
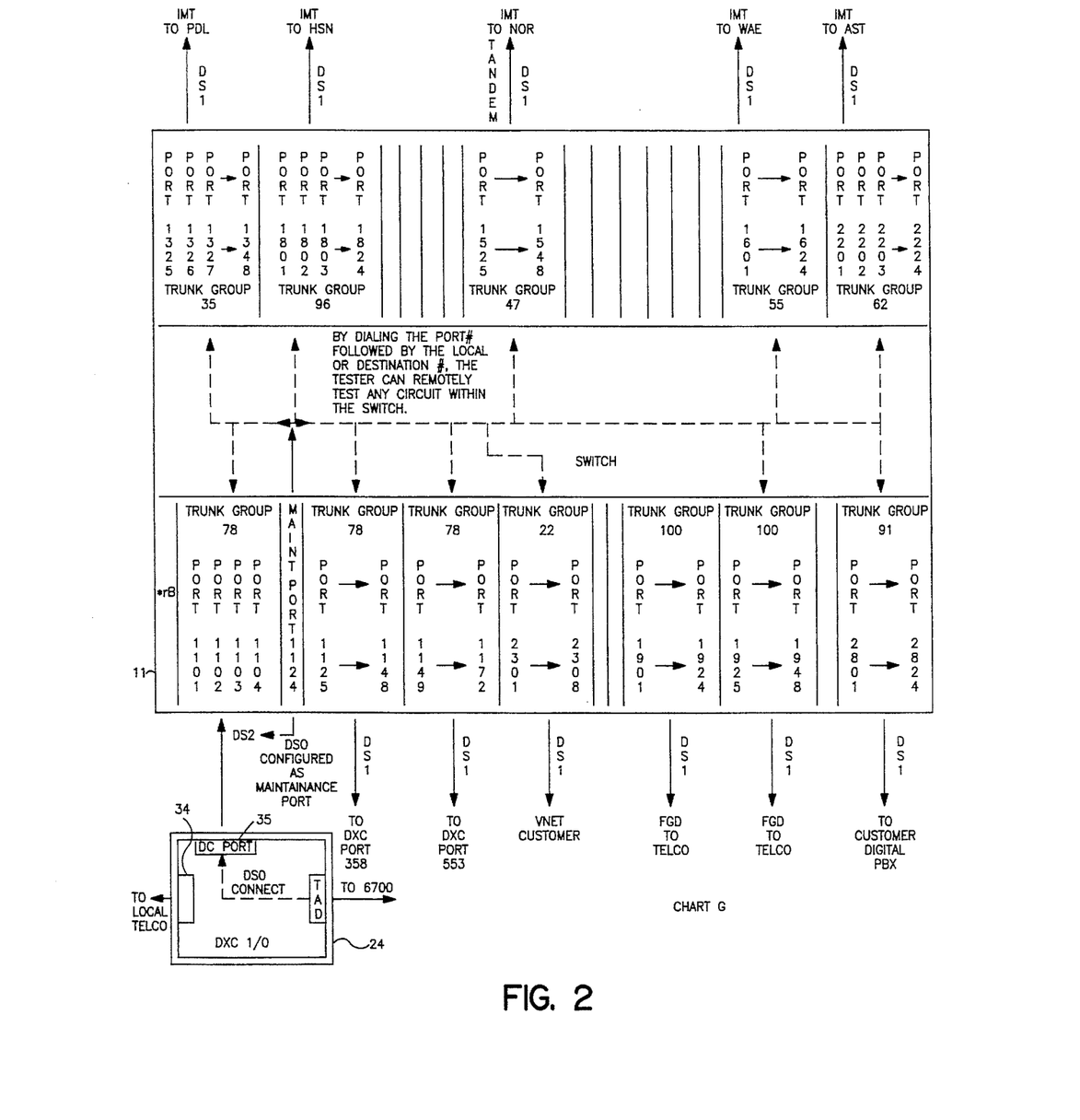
FIG. 2 is a flow chart illustrating a test scenario conducted from the test site for voice frequency channels.

Turning now to FIG. 2, there is shown an architectural drawing of the cross-connect switches 11 through 13. Each of the switches 11, 12 or 13 includes trunk groups with connections at DSφ level. Each DSφ level connection is called a port. The manufacturers of the digital switches provide for configuring any one of the ports as a maintenance port. In this example, the maintenance port was configured from the 24th DSφ of the T1 interfacing the switch. The remaining 23 DSφ s were configured as ports within trunk group 78.

FIG. 2 illustrates a DXC 1/0 interface 24 connected to the maintenance port of the switch 11. The DX 1/0 switch permits connection to the test system 26 which, as was noted, may be the Hekimian Model 6700 test device. The DXC 1/0 permits the 6700 to place a call through any selected output port of the switch when a DSφ from the DXC port 35 to the switch is configured as a maintenance port, as well as permits connection to be made via a second port 34 to a local TELCO. The DXC 1/0 permits calls to be routed either through the switch 11, or back towards a calling party through port 34, thus checking all segments of a call path.

With an appropriately configured maintenance port on the switch 11, it is possible to dial the port number from the test system 6700, followed by the called party destination number of a reported call trouble. In this way, any output port of the switch 11 can be selected, permitting the connection from the output port to the next switch to be tested.

The remaining ports of FIG. 2 are illustrated to show how various customers and local TELCOs interface with the switch. The output ports are all connected to other switches identified as PDL HSN NOR WAE and AST, which are geographically located to serve other TELCOs and customers via dedicated lines.

The switch 11 includes a log which identifies each call which has been placed through the switch by originating number, destination number and output port over which the call was placed. In carrying out testing of a call path, this information is retrieved from the switch via a terminal at the test site 33, which is connected via a telephone network to the local switch, which originated the call over the troubled calling path.

Returning again to FIG. 1, it is clear that the test site 33, based on the calling number obtained from the customer or through ANI, can identify which switch was initially involved in establishing the call path. An inquiry can be made from the test site 33 over a conventional telephone link to the switch site, requesting the port number which was used in the switch to connect the call to the next subsequent switch of the path.

As each of the output ports of switches 11, 12 and 13 are dedicated output paths to a subsequent switch, a test call can be placed to the originating switch placing the test call through the same output port of the circuit path which was identified as having a trouble.

Figure 3:
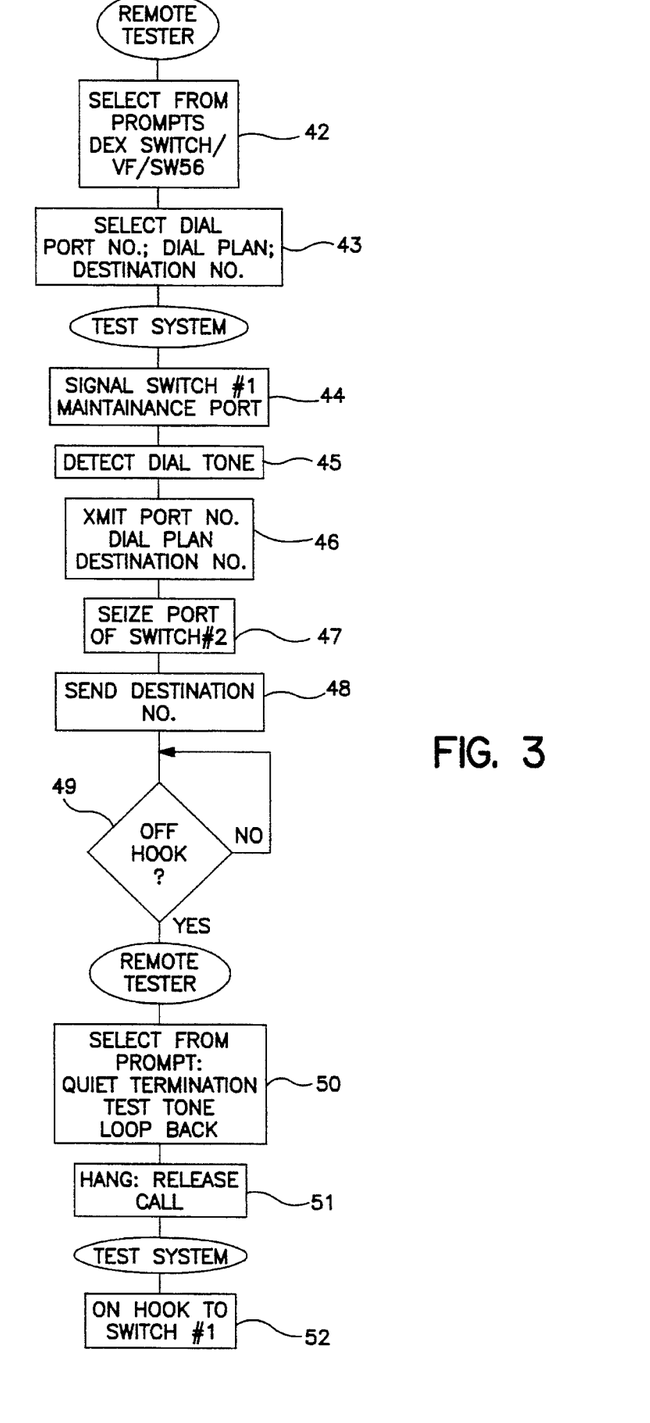
FIG. 3 is another test scenario conducted from the test site of voice channels using quiet term, test tone or loop back features.
Figure 4A:
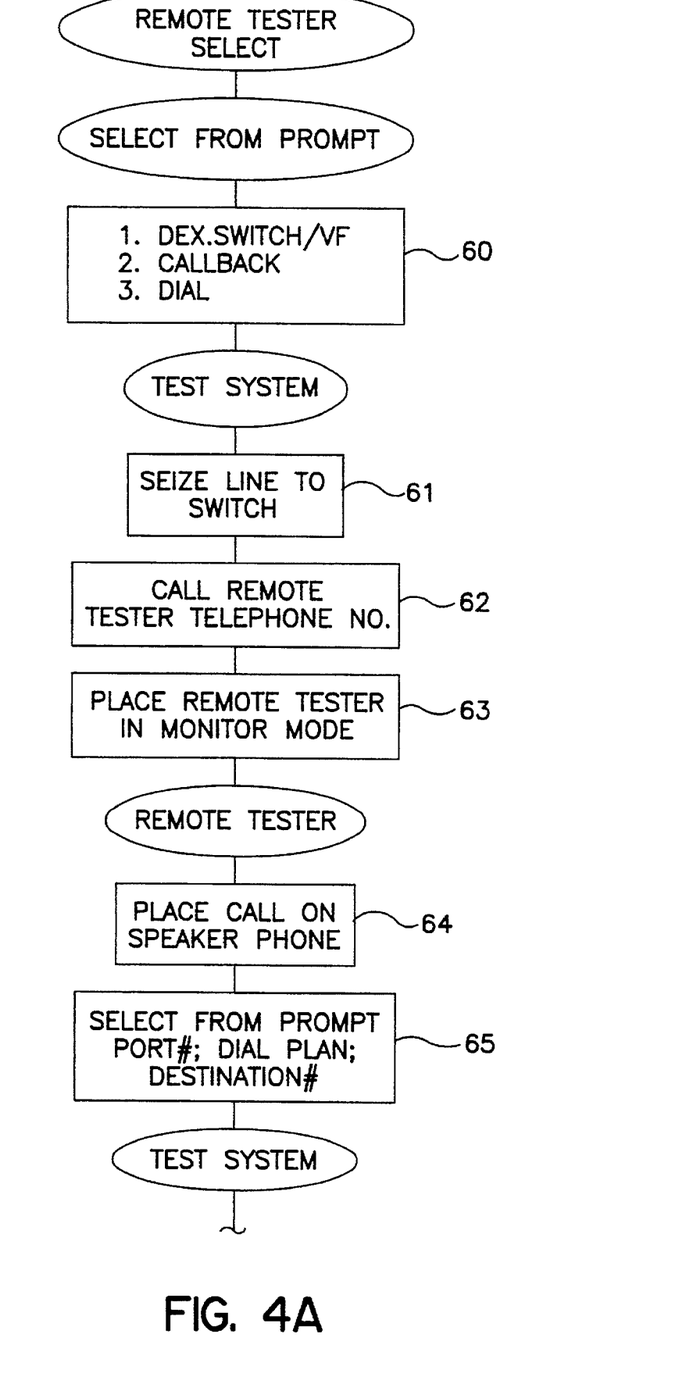
FIGS. 4A and 4B show a testing scheme in accordance with one embodiment of the invention for testing switched 56 circuits of the common carrier network.
Figure 4B:
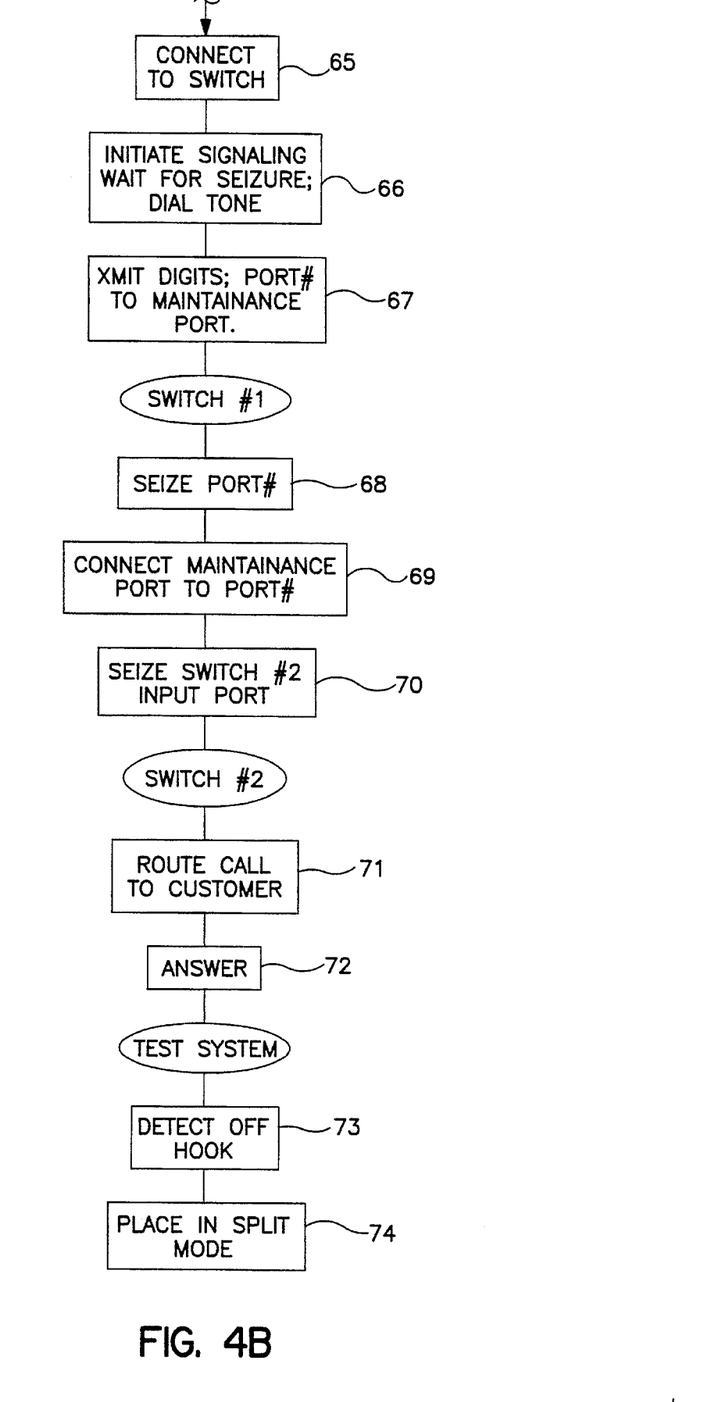
Figure 5:
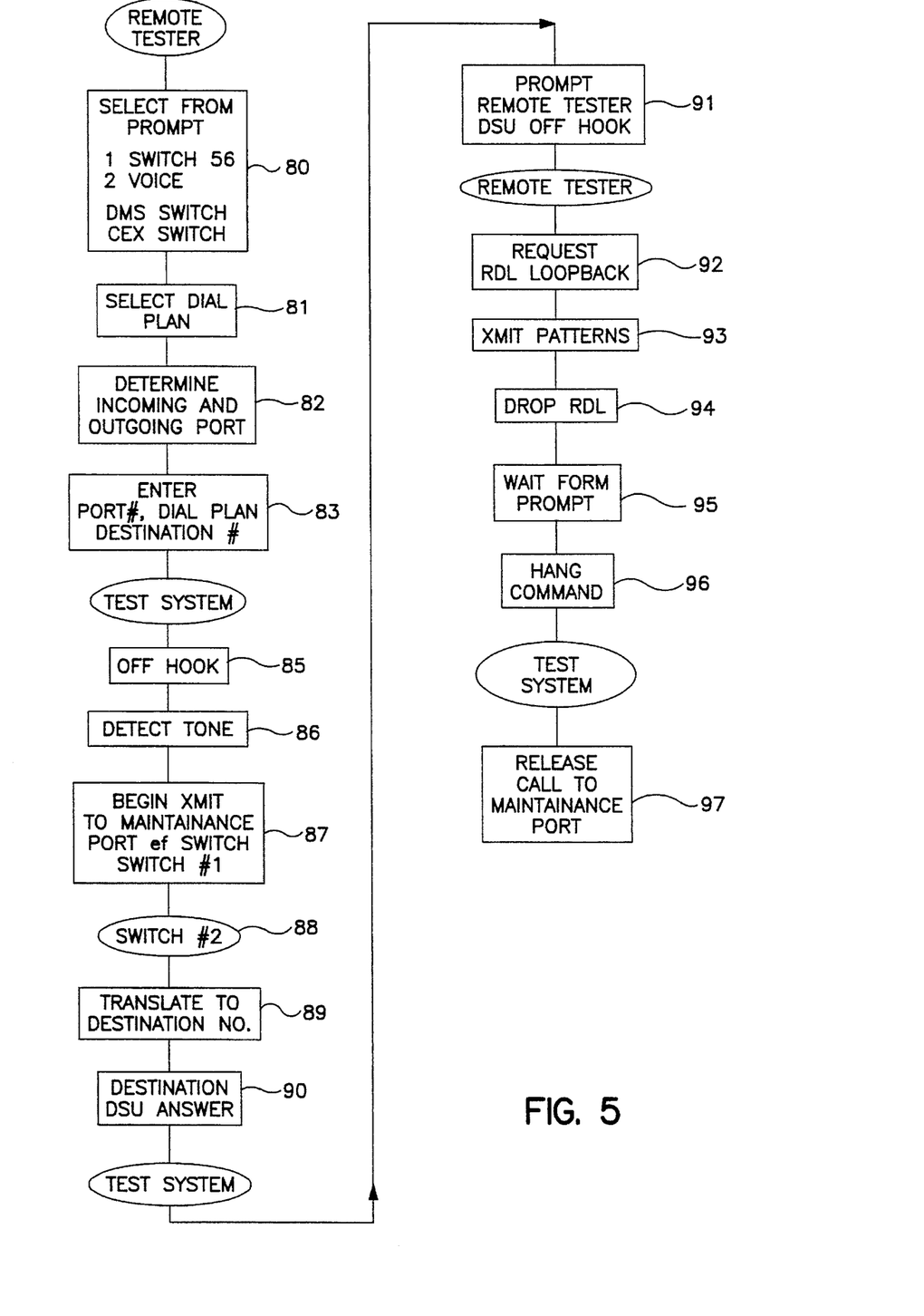
FIG. 5 shows in another embodiment of the invention for testings switched 56 data circuits.

It will be evident with respect to the flow charts of FIGS. 3, 4 and 5, that the test site 33 can command the test system 26 via the X.25 data network to place the same call as resulted in the trouble to the maintenance port of the first switch involved. Thus, in the case of voice station 22, or data station 21, that had originated a call to station 15 or 9, which resulted in a trouble, the test system 29 would initiate, via the maintenance port of digital switch 13, the same call to the same destination 9 or 15. The call so completed through the maintenance port will permit an evaluation at test site 33 of the call path performance, using the various known measurement techniques.

In the event that a trouble is identified as being on the call path, it can be assumed that it exists somewhere between the digital switch 13 and the called party 15 or 9.

Where a DAX is employed at the switch, it is also possible for the test system 29 to place a call back through to the calling party 21 or 22 and verify that portion of the path is performing appropriately.

In the event that the test call placed from switch 13 outwardly to the called party 9 or 15 identifies a trouble within the call path segment extending from switch 13, the subsequent test call can be placed from the next adjacent switch in the call path. As each output port is connected by a dedicated link to the next switch, it is easy for the test site 33 to identify the second switch in the path segment handling the call.

In the event it is determined that switch 12 is the second switch, it is possible to command the test system 26 to place the same call through the maintenance port of switch 12, via the T1 carrier link 25. Once again, an inquiry is made to the switch 12 to determine the output port of switch 12 which handled the original call which was subject to the trouble. The log of switch 12 will yield the output port of switch 12 which carried the original call, as well as the follow-up test call.

The test system 26 then places the same call to the same destination over the maintenance port of switch 12 via the T1 carrier link 25.

The process is repeated until the final switch within the call path has been identified. At this point, the trouble can be isolated to the local TELCO 6, and corrective action taken from that point by the local TELCO representatives.

Each of the TELCOs includes DSU 7, 8, 18 and 19 which provide for the signalling between its customers and the TELCO central office. As is known in the telephone communications art, it is possible to conduct various tests between the DSU, customer TELCO switch and a call site. These would include a loop-back arrangement permitting calls originating from test site 33 to monitor the result of various test patterns which are sent down to the DSU and returned via the call path, as well as to monitor quiescent noise levels and to send and/or measure various tones to a respective TELCO switch test numbers involved, as well as verbal communication with the customer over the same circuit. The present invention will permit these types of tests to be made from each of the switches involved in a call path which has generated a trouble report.

Turning now to FIG. 3, there is shown a first scenario for conducting tests of voice circuits which have been reported to have a trouble. The steps depicted in FIG. 3 illustrate the sequence of operation between the test site 33 and the test system 26 or 29.

The remote tester at test site 33 comprises a computer terminal which will generate menus for the operator to select a test to be conducted. The prompt 42 directs the operator at test site 33 to select the type of switch, i.e., DEX switch/VF, to be accessed by the testing system 26.

The remote tester at test site 33 would select either voice frequency VF or SW56 from the menu 42, depending on whether voice service or switched 56 service (a data service) is to be tested.

Finally, a prompt 43 is given to the test site terminal to select the port through which a call is to be placed and a dial plan. By executing a command such as CO IRV TAD, the test system 26 is commanded to select the first available DSφ T1 channel over the T1 24 for direct access to the maintenance port of the selected switch. At this point, the circuit is still in an on-hook condition. Assuming, for the example of FIG. 3, that the voice service VF is selected, the operator at the test site communicates with the appropriate data switch over a standard communication link (not shown in FIG. 1), call routing information is obtained from the switch which received the call which resulted in the trouble report. By interrogating the call routing table of the switch, it is possible to determine an entry corresponding to the calling party's ID, the destination party's ID, and a port number of the switch which was involved in the trouble. With this routing information, the test site operator can enter the following dial plan in step 43 in response to a prompt issued from the test system 26 the test site terminal 33. The dialing plan would be as follows:

DIAL 34264538# DTMF 703 842 4587

34264538 corresponding to the outgoing port of switch 13, which is connected to switch 12. Alternatively, the user can enter a path corresponding to a circuit from the switch 13 back to the customer placing the call. This dial plan would be as follows:

DIAL 29475447# DTMF 734 9534.

When the test site operator hits the return key on terminal 33, the inputted commands are transferred over the X.25 network to the remote Hekimian test system 29. The test system, via the T1 carrier link 27, will seize a channel to present an off-hook condition to the maintenance port 13a of switch 13 in step 44. This scenario presumes that switch 13 was the first switch in the long distance carrier network to receive the call originated from the calling party 22.

The maintenance port 13a of switch 13 will decode the foregoing dial plan and seize the outgoing port 34264538 identified in the dialing plan. The switch 13 output port identified in the dialing plan will seize a line connected to the next switch in the call path, assumed to be switch 12. Once the dial tone is returned back to the test system 26 from switch 13 in step 45, the port number for the selected path is sent to switch 13 and upon seizing the outgoing port to switch 12 in step 47, the dial plan and destination number are transmitted in step 46 to switch 12.

Once the port number is received by switch 13 the incoming port of switch 12 is seized in step 47. The destination number is then dialed over the output port to switch 12. The information received at the subsequent switch 12 is translated and the call placed to the subsequent switch 11. Once again, the received dialing plan in the input port to switch 11 is routed in step 48 to the appropriate TELCO 6 via a channel bank of one of the 24 DSφs on the T1 carrier link.

Thus, the routing path for the original call has been repeated for the call placed through the maintenance port of the originating switch 13. Once the destination TELCO 6 switch has received its ringing voltage, and answers by going off-hook in step 49, this condition will be monitored by the appropriate test system 26. A command sent over the X.25 network notifies the test site terminal 33 that the call has been placed. At this time, the test site operator can select from further prompts in step 50 on the test site terminal 33 the type of test to be conducted over the call path selected. These can be either quiet termination, test tone, or a loopback condition. The menu presented at the test terminal 33 will also permit various noise tests and tone level measurements to be made. A loop-back condition can be selected from the test terminal site 33 for conducting conventional loop-back tests.

Once testing is completed, the connection is broken by having the test terminal site issue a HANG command in step 51. This will command the test system 26 or 29, depending which has initiated the call, to break the connection by going on-hook again in step 52.

The foregoing process can be repeated for each switch in the call path. Assuming that a trouble was detected on the tested call path, the process of FIG. 3 may begin again by selecting a dial plan which is initiated through the second switch 12. If the subsequent testing in accordance with FIG. 3, through the maintenance port of switch 12 does not clear the trouble, it can be assumed that the trouble lies between switch 12 and the destination station 15. The dialing plan is obtained by doing another search within the connection table of switch 12 for the output port involved in the tested circuit path. Once the output port is obtained, another dial plan is entered, using the same destination number and output port number. The series of tests shown in block 50 are again repeated. In the event the trouble exists in the dedicated link between switches 12 and 13, this condition will be identified, and corrective measures may be taken.

The foregoing is a simple test scenario which can be carried out using the system of FIG. 1. A more involved testing routine is shown in FIGS. 4A and 4B for testing voice circuits which have been reported to have a trouble. The test scenario begins from prompts which are available at the test site monitor 33, originated from the test system 26 or 29. The prompt will request selection of the switch type, i.e., DX or DEX switch, and service type, i.e., VF for voice service. The prompt 60 will also permit a request for a call-back number, permitting the test system 26 to call a test site operator over a voice channel. The call-back number is entered as part of the command in response to a prompt.

When this command is received by the test system 26, an available phone line is seized by the test system 26, and the call-back number is entered in step 61 placing a call to the test site. Once the test site goes off-hook answering the call in step 62, the call can be placed in a monitor state in step 63, permitting the call progress of calls made from the test system 26 through the maintenance port of a selected switch to be monitored. Placing the call through a speaker phone in step 64 permits the test site to monitor the call progress over the dial plan that is entered in the subsequent prompt. Further, a verbal communication can be established between the remote test site 33 and the called party.

The next prompt 65 requests a dial plan to be entered, as was done in FIG. 3. A port number, established from doing a table search of the first switch in the call path reported as having a trouble is entered. The string command, representing port number, dial plan and destination number, would appear as follows:

DIAL 284617483# MF*706 34576453#.

This command represents multi-frequency signalling placing a call to the destination corresponding to the destination of the reported trouble.

A similar path may be selected from the switch back to the originating calling party. Such a command would appear as follows:

DIAL 25091735# MF*7651294#.

Once the dial plan has been entered in 65, and the return command given at the site terminal, the test system 26 will attempt to connect the selected switch 13. Protocol involved in step 66 requires a start loop signalling mode, a time period to wait for the seizure, followed by a dial tone. When this portion of the protocol is completed, the test system 26 will initiate the dial plan digits including port number, destination number to the maintenance port of the selected switch in step 67.

The switch in step 68 will seize the port identified from the command, and in step 69 connect the seized port of the switch 13 to the maintenance port.

The switch 13 will seize the input port of the next switch 11 in the call path in step 70.

Step 71 represents the routing of the call by the remaining switches in the call path to the customer based on the dial plan.

The called party or the connected TELCO switch answers in step 72. The off-hook condition is forwarded to the test site monitor 33 in step 73, identifying to the test site terminal 33 that the call has been placed.

All during the foregoing, the test site operator, by listening to the speaker phone, has been able to monitor the call progress, giving the test site operator some insight into whether the call placement has experienced any difficulty.

Once the destination party 15 has gone off-hook, the tester's call back circuit is placed in the split mode in step 74. This will permit the test site operator to communicate verbally with the called party through the established call path.

The tests referred to in FIG. 3, i.e., test tones, quiet terms, and loop-backs, can be effected by generating the appropriate commands from the test system for appropriate testing to the TELCO test number dialed. These tests are standard industry tests which may be carried out without further description.

The foregoing system for testing call paths is adaptable in data communications as well. In the switch 56 service, customers take advantage of the dial up access of MCI switches, and pay only for the time a circuit is in use, saving any monthly access charge that may be applicable to other services. FIG. 5 illustrates the steps carried out by the same hardware used to test the switched 56 data circuits of the long distance carrier.

Referring now to FIG. 5, the process begins from a series of prompts 80, which appear at the test site terminal 33.

The user selects whether the test is over a switch 56 circuit or a voice circuit. The switch type is selected as either DMS switch or DEX switch, as is known to the test site operator. As in the VF service, a test is conducted when a customer reports a trouble in a call path originated by the customer from a data terminal 21 to a second terminal 10 via the long distance carrier network.

The dial plan is entered in step 81 at the remote tester terminal, and assuming that a test of the outgoing port of the originating switch is desired, the dial plan would be as was in the previous tests, i.e.,

DIAL 34264538# DTMF 703 842 4587.

The incoming and outgoing ports are determined from doing a call search in step 82 as was done in the previous example via a connection to the particular switch which originates the data traffic, which, in the illustration of FIG. 1, is switch 13. Having established what the outgoing port is, the dial plan is entered in step 83 by identifying the port number, dial plan and destination number. The entered data is forwarded via the X.25 data or T1 network to the test system 29. The test system 29 will go off-hook in step 85 and when it detects a tone returned in step 86 from the maintenance port 13a of switch 13-3, it will begin to transmit to the maintenance port the calling data in step 87.

The maintenance port 13a, upon receiving the dial digits, will select the output port identified in the dial plan to begin the call placement to the next switch 12 in the series. Switch 12 will translate the destination number into a routing plan in step 89 and eventually the call will be sent over the network to the destination DSU, via a private line configuration or through a TELCO access tandem switch in the event of feature Group D switched 56 service, as represented in step 90, the destination DSU being identified as 8 in FIG. 1 for the data station 10.

When the data station 10 goes off-hook, the condition is reported from the test system 26 to the test site 33 via a prompt 91. At this point, the remote test site 33 may engage in standard testing of the circuit established. An RDL loop-back may be requested in step 92 at the test site 33 remote tester. Various known transmit patterns are transmitted in step 93 over the circuit path established, and back from the RDL loop-back. Performance may be measured for this standard test, and as was done in voice frequency, subsequent calls placed over subsequent switches in the call path to isolate a problem segment of the call path.

At the conclusion of any such tests, the test site 33 may command, in step 94, to release the RDL loop-back. Upon receipt of an appropriate prompt in step 95, the test site 33 remote tester may issue the HANG command 96, ending the test session. As in voice frequency, the test systems 26 and 29 respond to the HANG command by releasing the calls to the particular connected maintenance port, resulting in a tear-down of the call.

Thus, there has been described a system which will permit remote testing of all circuit paths which appear to be in trouble. This remote testing will isolate a segment of a call path without requiring personnel to be present at each switch location, expediting the clearing of troubles. Those skilled in the art will recognize yet other embodiments of the invention defined by the claims which follow.

What is claimed is:

1. A remote test facility for testing a call path of a long distance carrier comprising:

a remote test site connected by a first T1 carrier to a maintenance port of a first switch of said long distance carrier, for placing a call through a selected port of said switch to a desired destination and connected by a second T1 carrier to a maintenance port of a second long distance carrier switch connected to said first long distance carrier switch, permitting said call to be made through a selected port of said second switch, whereby first and second portions of a call path are tested to isolate a fault in said call path; and, a test facility terminal connected to said remote test site for identifying to said remote test site said selected port of said switches and a destination of a call path to be tested.

2. The remote test facility of claim 1 wherein said test site initiates a remote digital loop-back to a DSU of said destination when said call has been placed.

3. The remote test facility of claim 2, wherein said test site commands said remote test site to perform a pattern test over said placed call and loop-back connection.

4. A method for remotely testing a call path through a long distance carrier switch comprising:

determining a calling path from a call which has been placed through said long distance carrier switch by consulting a log of said switch containing call information;

remotely placing said call through a maintenance port of said switch through an output port identified in said switch log over said calling path to a destination; and, measuring the performance of said calling path.

5. The method of claim 4, wherein said method of measuring the performance of said calling path comprises:

establishing a remote digital loop-back to a destination DSU; and, applying a test pattern to said calling path and measuring a response through said digital loop-back.

6. A method for remotely testing call paths in a telecommunications system which interconnects a plurality of local telephone companies through a plurality of switches interconnected by long distance carriers comprising:

connecting a test facility to each of said switches, permitting said test facility to place a call through a selected port of said switches;

connecting said test facility over a data network to a support station to permit said support station to request said test facility to place a call through any of said switches through a selected port of said switches to a selected destination;

determining at said support station a call path which has been reported by a customer as being troublesome, including the switches through which said customer's call was routed, and an output port of each of said switches over which said call was placed; and, requesting from said support station said test facility to place said call through each of said determined switches and determined output ports to the destination of said customer's call isolate a troublesome portion of said call path.

7. The method for remotely testing call paths in a telecommunication network of claim 6, further comprising placing each of said calls through a maintenance port of said switches by identifying to said maintenance port an output port and a destination to receive said call.

8. The method for remotely testing call paths in a telecommunications network according to claim 7, comprising:

establishing a loop-back with a local telephone network servicing said destination after placing each call; and, monitoring the performance of the path established by said call over said loop-back.

9. The method according to claim 8, wherein said step of monitoring further comprises applying a test pattern to said test path.

10. The method of claim 6, wherein said support station transfers said requests as a data message over an X.25 data or T1 network.

11. The method of claim 6 further comprising establishing verbal communication to said destination over said call path.

12. A method for remotely testing a call path established over a telecommunication system which interconnects a plurality of local telephones, when said call path is reported to be substandard by a calling party using said call path, comprising:

connecting a maintenance port at each switch of said telecommunication network to a remote test site via a T1 carrier;

connecting each remote test site via a data network to a central testing facility which forwards digital commands to said remote test site;

determining from said central testing facility a first switch of said call path which is connected to said calling party and each remaining switch of said call path;

issuing a command from said central testing facility to a remote test site connected to said first switch, to place a call through a maintenance port of said first switch over said call path;

testing said call path from said test site connected to said first switch;

issuing subsequent commands to a maintenance port of each remaining switch of said call path via a connected test site to establish a remaining portion of said call path from said subsequent switches in said call path; and, testing each remaining portion of said call path established by each of said remaining switches of said call path.

13. The method for remotely testing a call path according to claim 12, further comprising:

establishing a call back communication circuit between said central facility and a test site placing a call over said call path; and, monitoring at said central facility via said communications circuit call progress signals generated by placing said call over said call path.

14. The method for remotely testing a call path according to claim 12, wherein each portion of said call path is tested by establishing a loop back over said portion of said call path;

transmitting a transmit pattern over said call path and loop back; and, monitoring the performance of said call path and loop back to said transmit pattern.

15. The method for remotely testing a call path according to claim 12, wherein said central facility includes in said command for placing a call through a maintenance port of a switch the identity of a port through which said call is to be placed.

16. The method for remotely testing a call path according to claim 12, wherein said command is formulated with a dialing plan which was used by said first switch to establish said call path for said calling party.

* * * * *